Feb. 23, 1965   B. T. HOWES ETAL   3,170,292
LUBRICATING SYSTEM FOR A GAS TURBINE ENGINE
Original Filed April 4, 1960   8 Sheets-Sheet 1

Inventors
BENJAMIN T. HOWES
IVAN M. SWATMAN

By John R. Faulkner
Keith L. Gerschling
Attorneys

Feb. 23, 1965 B. T. HOWES ETAL 3,170,292
LUBRICATING SYSTEM FOR A GAS TURBINE ENGINE
Original Filed April 4, 1960 8 Sheets-Sheet 3

INVENTORS
BENJAMIN T. HOWES
IVAN M. SWATMAN
John F. Faulkner
Keith L. Zerschling Attorneys

BENJAMIN T. HOWES
IVAN M. SWATMAN

Feb. 23, 1965 B. T. HOWES ETAL 3,170,292
LUBRICATING SYSTEM FOR A GAS TURBINE ENGINE
Original Filed April 4, 1960 8 Sheets-Sheet 6

Inventors
BENJAMIN T. HOWES
IVAN M. SWATMAN

By John L. Faulkner
Keith L. Zerschling
Attorneys

Inventors
BENJAMIN T. HOWES
IVAN M. SWATMAN

United States Patent Office 3,170,292
Patented Feb. 23, 1965

3,170,292
LUBRICATING SYSTEM FOR A GAS
TURBINE ENGINE
Benjamin T. Howes and Ivan M. Swatman, Birmingham, Mich., assignors to Ford Motor Company, Dearborn, Mich., a corporation of Delaware
Original application Apr. 4, 1960, Ser. No. 19,797. Divided and this application Nov. 21, 1960, Ser. No. 70,460
6 Claims. (Cl. 60—39.08)

This invention relates to a gas turbine engine and more particularly to a compact gas turbine engine suitable for use in an automotive vehicle.

This application is a division of our copending application Serial No. 19,797, entitled Gas Turbine Engine, filed April 4, 1960.

The gas turbine engine of the present invention includes a low pressure spool having a compressor and a turbine, a high pressure spool having a compressor and a turbine, a power turbine, a primary burner and a secondary or reheat burner. Additionally, it may include intercoolers connected between the low pressure spool compressor and the high pressure spool compressor, and recuperators connected between the high pressure spool compressor and the primary burner.

The high pressure spool runs at a near constant speed over most of the load range of the engine, from 70% of rated speed at idle to 100% of rated speed at full power. The high pressure spool thus provides an excellent power source for the accessories associated with the engine and the vehicle in which the engine is mounted, such as, engine oil pumps, power steering pumps and an electrical generator. The pumps and generator provided can thus be substantially smaller than those employed with conventional engines since they operate over a speed range of 70%–100% of the rated speed of the high pressure spool.

The present invention provides an intergrated lubricating system for the gas turbine engine of the present invention is provided for lubricating the bearings supporting the various shafts in the engine and for lubricating the various gear sets employed. As previously mentioned, a plurality of engine oil pumps are driven by the high pressure spool at substantially a constant speed over a wide load range. It is preferred to employ three pumps, with two of these pumps being connected to collection points or sumps in the engine for delivering oil to a common collection point or sump which is connected to the third pump. The third pump delivers oil under pressure to the various bearings and gear sets that need lubrication, preferably through an oil filter and an oil cooler. An important feature of the lubrication system is the provision of strategically placed check valves which prevent the oil in the system from draining into the various collection points or sumps when the engine is at rest. Thus, all of the points of the engine which need lubrication are adequately lubricated from the moment the engine is started.

An object of the present invention is the provision of an integrated lubricating system for a gas turbine engine.

Other objects and attendant advantages of the present invention will become more readily apparent when the specification is considered in connection with the attached drawings in which, FIG. 1 is a perspective view of the gas turbine engine of the present invention with portions cut away;

FIGS. 2 and 3, when disposed in side to side relationship, constitute a longitudinal sectional view of the gas turbine engine of the present invention;

Figure 1:
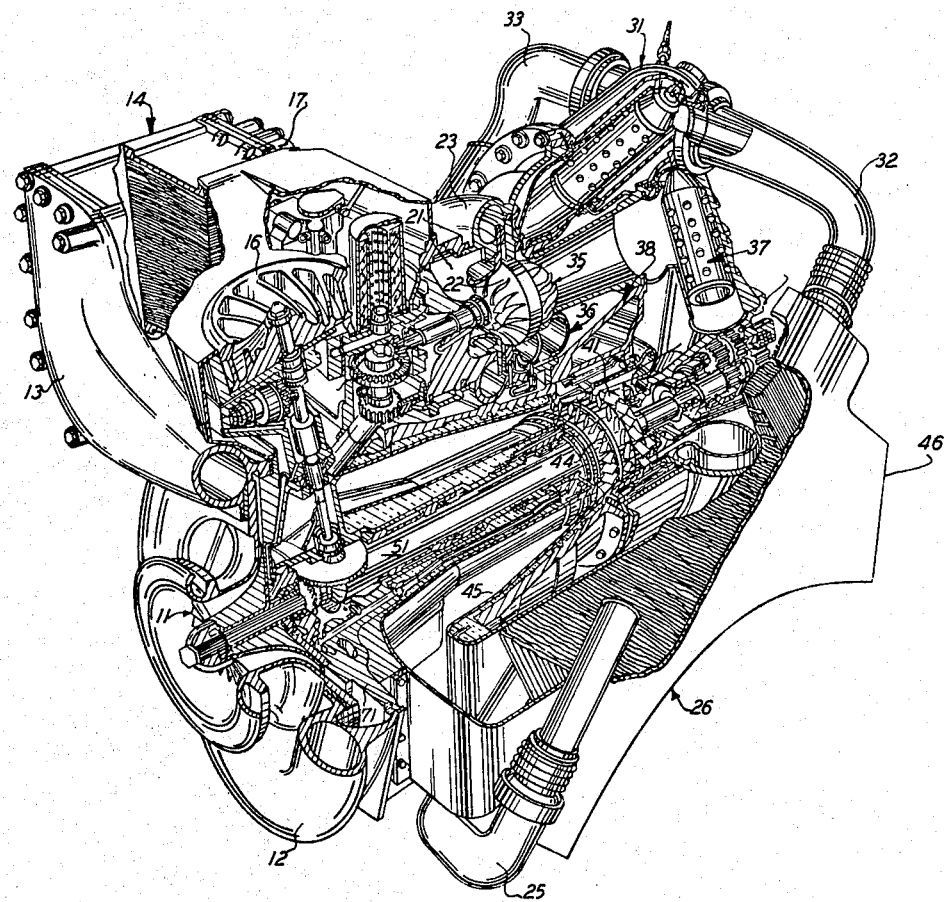

Referring now to FIG. 1, air is taken into the gas turbine engine of the present invention by means of a low pressure compressor, preferably a centrifugal compressor 11, where it is compressed prior to delivery to a pair of twin scrolls 12 and 13. The twin scrolls divide the air flow from the low pressure compressor for delivery to a pair of intercoolers, one of which is shown at 14. These intercoolers are of the cross-flow air to air type, and are supplied cooling air by a fan 16 which delivers cooling air outwardly from the center of the power plant through the intercooler structures. From the intercoolers, the coled air is recombined by means of a pair of ducts, one of which is shown at 17, and is then fed into the inlet chamber 21 of high pressure spool compressor 22 which is preferably of the centrifugal type. The high pressure spool compressor further compresses the air and delivers it into scroll 23.

The air from the high pressure spool compressor is then divided into two flows paths by means of a pair of conduits, one of which is shown at 25, for delivery to a pair of recuperators, one of which is shown at 26. The heated air from the recuperators is recombined in the primary burner 31 by means of conduits 32 and 33 which extend from the recuperators into either side of the burner 31.

The compressed air is then heated in the primary burner by the addition of fuel through the nozzle 34 (see FIG. 3) which may be of the recirculating type. The effluent from the primary burner is then delivered to a high pressure turbine 35, which is preferably of the radial inflow type, through a scroll 36. The high pressure turbine furnishes the power for driving the high pressure compressor, and these two devices together with the shaft for supporting them is known as the high pressure spool. The gases from the high pressure turbine are then delivered to a secondary or reheat burner 37 by means of a central conduit 38. The gases are then reheated to a high temperature in the reheat burner before being fed to a power turbine 41 through a scroll assembly 42 and a nozzle assembly 43.

From the power turbine 41 the hot gases expand through a two-stage low pressure turbine, generally designated by the numeral 44, into a diffuser 45. The exhaust gases are then split and led into the recuperators one of which is shown at 26. As the exhaust gases flow through the recuperators heat transfer takes place between these exhaust gases, and the compressed air from the high pressure compressor 22. The cooled exhaust gases are then expelled to the atmosphere through exhaust conduits one of which is shown at 46. The low pressure compressor 11 and the low pressure turbine 44 together with their interconnecting shaft form the low pressure spool.

Referring now to FIGS 1 through 4, the low pressure spool, the low pressure spool housing and associated elements will be explained in greater detail. The low pressure spool comprises the low pressure compressor 11, the two-stage low pressure turbine 44 and the interconnecting shaft which is designated by the numeral 51.

The two-stage low pressure turbine 44 includes a first rotor 52 and a second rotor 53 with an interstage nozzle 54 interposed between them.

The low pressure spool is rotatably mounted in a low pressure spool housing 71 by means of sleeve bearings 72 and 73 and a double ball bearing 74. These bearings are suitably lubricated by means of a lubrication system which will be explained more in detail at a later point in the specification. Oil under pressure is supplied from this system to conduit 75 drilled in the low pressure spool housing 71. (See FIG. 4.) From this conduit the oil under pressure is supplied to the bearing 72, which is carried by bearing carrier 70, through conduit 76 drilled in the housing 71 and a pipe 77 which includes check valve 78. The sleeve bearing 73 is supported in a cylindrical sleeve 79 which is in turn supported by the low pressure spool housing. This sleeve has a longitudinal conduit 81 positioned therein which connects the sleeve bearing 73 to the oil under pressure in conduit 75 through conduit 82 drilled in the low pressure spool housing, transfer piece 83 and conduit 84 drilled in the sleeve.

Lubricating oil under pressure is also supplied to the double ball bearing 74 from the conduit 75 by means of conduits 86 and 87 in the low pressure spool housing 71, an annular passageway 88 in bearing carrier 89, passageway 91 in the bearing carrier and a transfer piece 92 connected to the passageway 91. The bearing carrier 89 is positioned within the low pressure spool housing 71 and is affixed thereto, along with plate 63, by means of a plurality of bolts, one of which is shown at 90. (See FIG. 2.) The transfer piece 92 directs oil upon the double ball bearing 74 and upon the mesh between bevel gear 93 affixed to the low pressure spool shaft 51 and the bevel gear 94 affixed to shaft 95, which interconnects the bevel gear 94 and the fan 16. The shaft 95 is formed from two pieces which are interconnected by a splined sleeve 96. Oil is also directed against the flange 61 of sleeve 60 via passageways 97 and 98 in the bearing carrier 89 to provide an anti-thrust bearing for the low pressure spool.

The gas turbine engine of this invention is provided with an oil sump 101 suitably affixed to the bottom portion of the low pressure spool housing 71. Scavenge oil from the double ball bearing 74 falls downwardly through the cored portion of the housing 71 into this sump. Similarly, scavenge oil from the sleeve bearing 73 is directed into the sump 101 from chamber or auxiliary sump 102 and pipe 103 which connects the chamber 102 to an open space in the housing 71. A labyrinth seal is positioned adjacent the bearing 73 to prevent any oil from going down the shaft in the direction of the sleeve bearing 72. This labyrinth seal assures that the scavenge oil from the sleeve bearing 73 will find its way into the chamber 102. Scavenge oil from the sleeve bearing 72 falls into a chamber or auxiliary sump 104 positioned in the bearing carrier 70, and is then directed to a scavenge pump, which will be described at a later point in the specification, by means of pipes 105, 106 and a conduit 107, which is formed by drilling of the low pressure spool housing 71.

Figure 6:
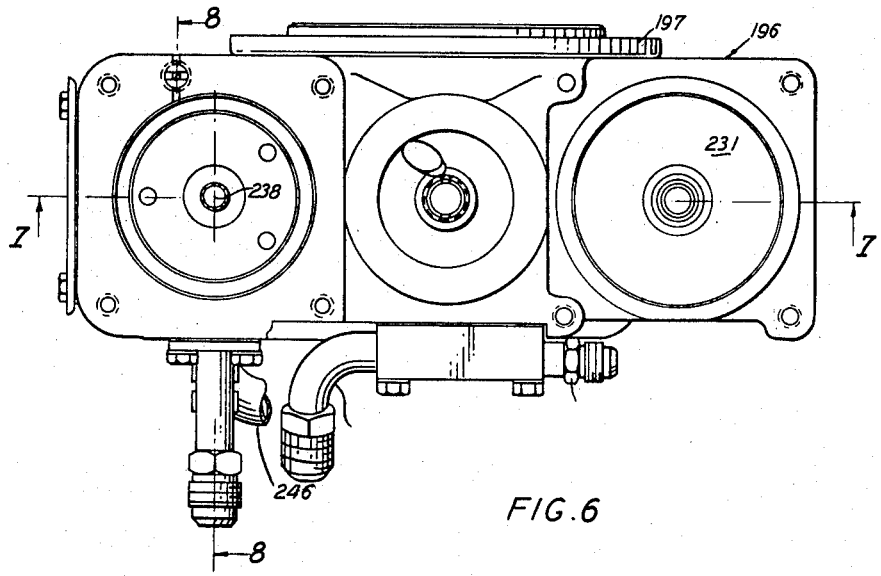
FIG. 6 is a top plan view of the accessory gear box of the present invention.
Figure 7:
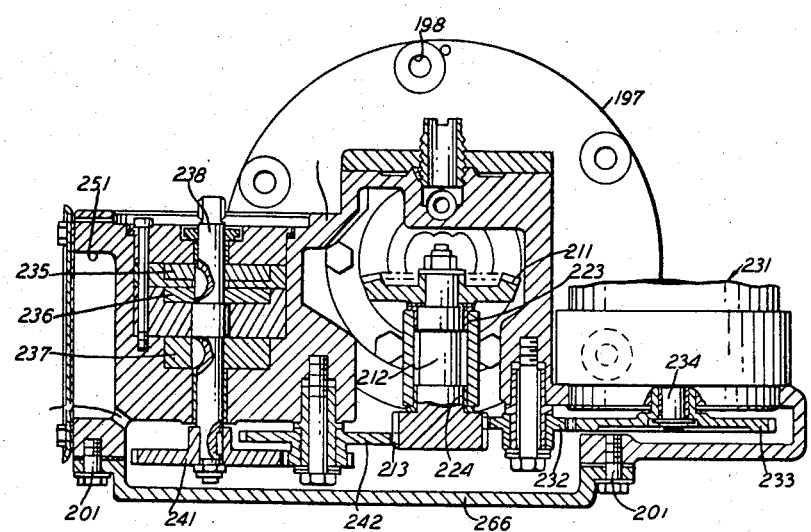
FIG. 7 is a sectional view taken along the lines 7—7 of FIG. 6.

The high pressure spool housing 182 has affixed thereto an accessory gear box housing, generally designated by the numeral 196. The accessory gear box is shown in FIGS. 6 and 7, and as shown in FIG. 7, has a plate 197 with a plurality of apertures 198 for receiving the bolts (not shown), to affix the accessory gear box housing to the high pressure spool housing. The accessory gear box also includes a bottom pan 200 affixed to the housing 196 by a plurality of bolts 201 (FIG. 7).

As previously mentioned, the high pressure compressor 22 and the high pressure turbine 35 are combined in a back-to-back relationship, and are preferably one structural member. A shaft 205 extends from the compressor side of the combined compressor-turbine member, and is supported in the high pressure spool housing by means of a sleeve bearing, designated by the numeral 206. The shaft 205 is also supported in the accessory gear box housing by means of a double ball bearing 207. A gear 208 is affixed to the end of the shaft 205 by a nut 209, and this bevel gear meshes with another bevel gear 211 affixed to a shaft 212. A spur gear 213 affixed to the shaft 212 serves to drive a combined starter-generator for the engine, as well as a plurality of engine oil pumps which will be explained in detail at a later point in the specification.

Oil under pressure for lubricating the sleeve bearing 206 and the double ball bearing 207 is supplied from a conduit 216. From the conduit 216 oil flows into conduit 217 and to the sleeve bearing 206 through conduits 218 and 219. Oil for lubricating the bearing 207 flows into an annular channel 220, and a portion of this oil from the annular channel also flows through conduits 221 and 222 to lubricate the sleeve beaings 223 and 224 which support the shaft 212. Oil from the bearings 206, 207, 223 and 224 flows into the bottom of the accessory gear box housing and from there into the cored openings in the low pressure spool housing 71 by means of a conduit 225 which connects the accessory gear box housing with the low pressure spool housing. From the cored openings in the low pressure spool housing the oil then finds its way into the sump 101.

Figure 8:
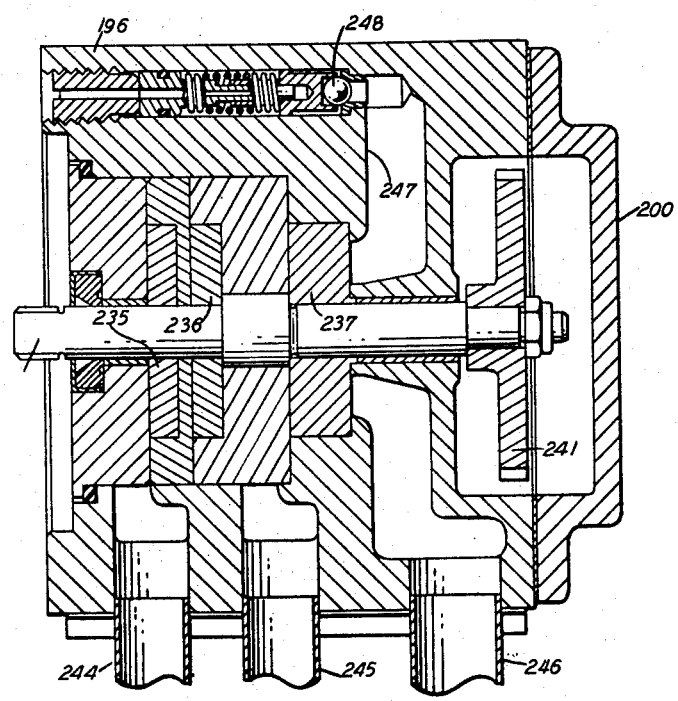
FIG. 8 is a sectional view taken along the lines 8—8 of FIG. 6.

Referring now to FIGS. 6 through 8, there is shown the accessory gear box including the housing 196. As previously discussed, the accessory gear box housing supports a bevel gear 211 driven by the bevel gear 208 affixed to the shaft 205 of the high pressure spool. The bevel gear 211 drives a spur gear 213 through the shaft 212. The spur gear 213 drives a combination starter-generator 231 through an idler gear 232 and a spur gear 233 affixed to a shaft 234 of the combination starter-generator. The spur gear 213 also drives three oil pumps, preferably of the Gerotor type, designated by the numerals 235, 236 and 237. The internal rotors of the Gerotor pumps are mounted on a common shaft 238 having a spur gear 241 affixed thereto. The spur gear 241 is driven by the spur gear 213 through an idler gear 242. The center section of the accessory gear box housing carries an oil filter 243, which can best be seen by reference to FIG. 2.

FIG. 8 shows an enlarged view of the three Gerotor pumps 235, 236 and 237, and also discloses inlet conduits 244, 245 and 246 to these Gerotor pumps. Engine lubricating oil is received by the Gerotor pump 237 from the inlet 246 and is discharged to an outlet conduit 247. The connection of the outlet 247 to the remainder of the lubricating system will be described at a later point in the specification. A pressure relief valve 248 is provided in the outlet conduit 247 to prevent unduly high pressures from being developed in the pump 237. Gerotor pump 236 receives oil from the inlet conduit 245 and the Gerotor pump 235 receives oil from the inlet conduit 244. Oil is discharged from these two pumps into chamber 251 in the accessory gear box housing (FIG. 7. The oil from the chamber 251 then flows through an opening 252 into the bottom pan 200 of the accessory gear box housing where it is discharged into the cored opening in the low pressure spool housing 71 by means of the conduit 225, as was previously explained in connection with FIG. 2.

Figure 3:
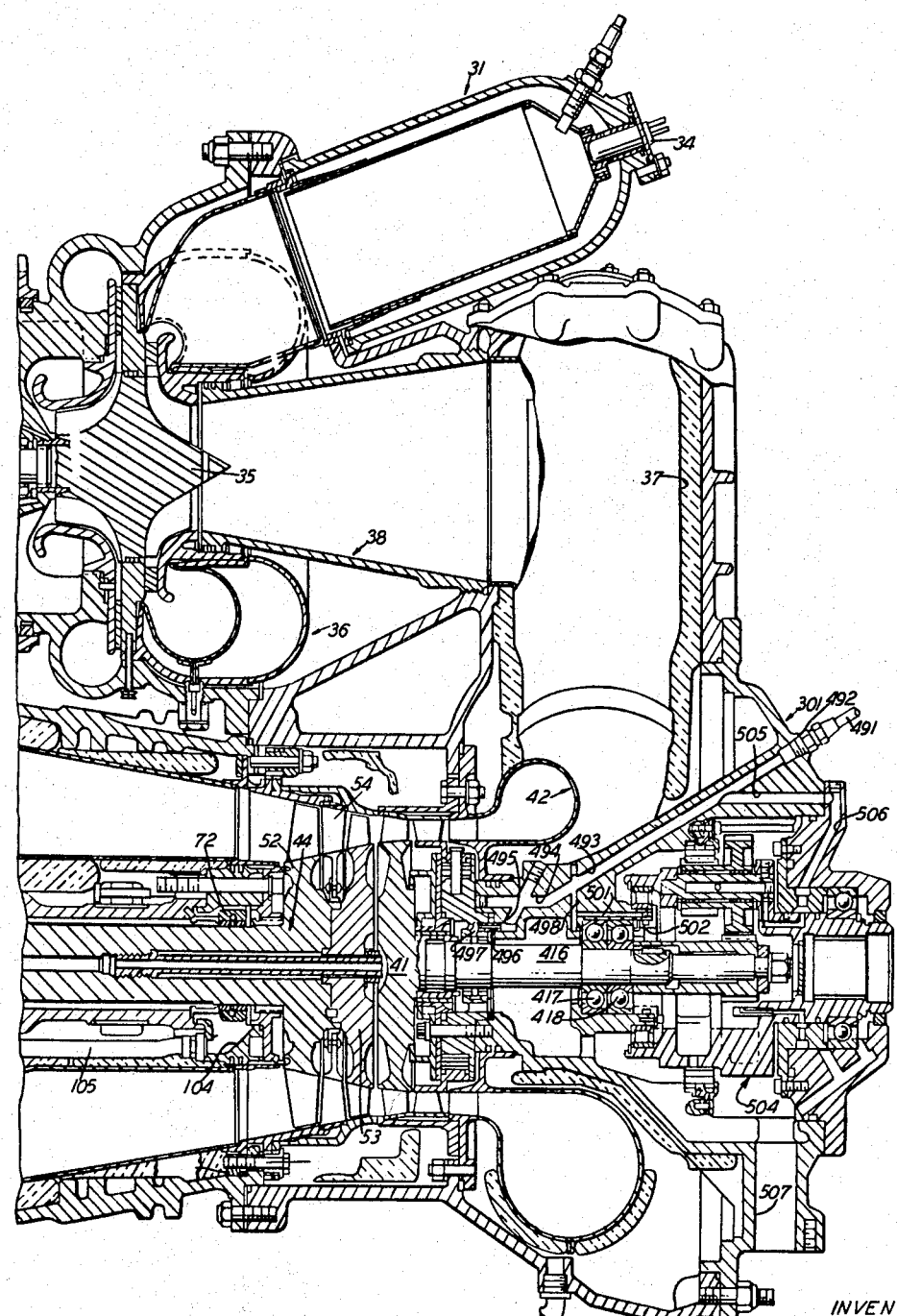
Figure 4:
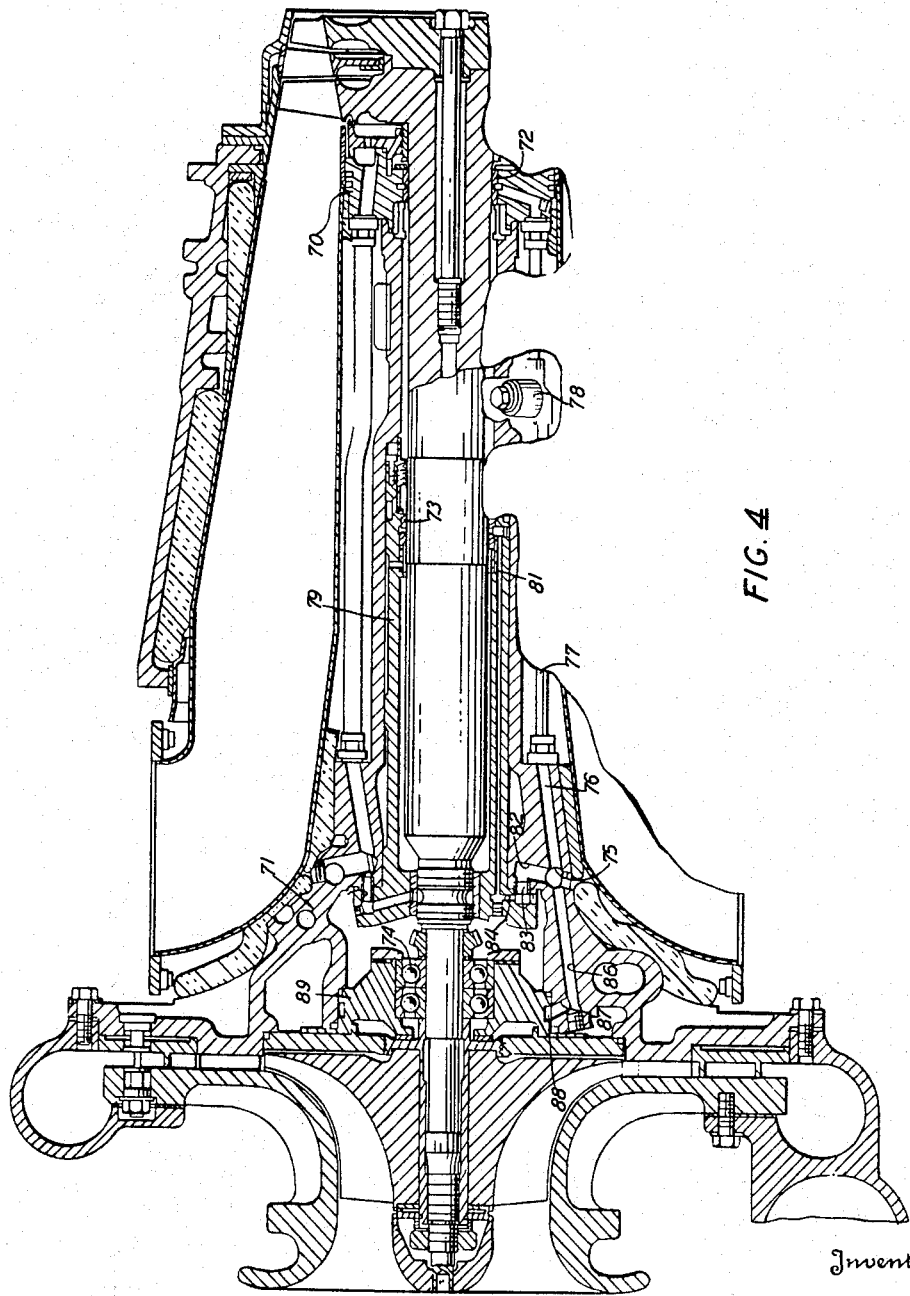
FIG. 4 is a partial longitudinal sectional view taken substantially normal to FIGS. 2 and 3.

Referring specifically to FIG. 3, the power turbine 41 includes a shaft 416 which is rotatably supported in the reduction gear housing 301 by means of a pair of anti-friction thrust bearings 417 and 418 and a sleeve bearing 433.

Lubricating oil is conveyed to the housing 301 from the lubrication system of the engine by way of a conduit 491 which is threaded into the housing at 492. From the conduit 491 lubricating oil is supplied to the bearing 433 via conduits 493, 494 and 495, oil transfer tube 496 and groove 497. Lubricating oil is similarly supplied to the bearings 417 and 418 via conduits 493, 498, 501 and 502.

A planetary reduction gear train generally designated by the numeral 504 and shown in FIG. 3 is employed to reduce the speed of the power turbine shaft 416 so that usable speeds, to drive a load, such as a motor vehicle, are available at the output shaft 412. This gearing is lubricated with oil flowing through the conduits 493, 505 and 506. The lubricating oil used in the lubrication of the bearings 417, 418 and 433 and the gear train 504 falls to the bottom of the housing 301 and may be scavenged through the bore 507.

Figure 9:
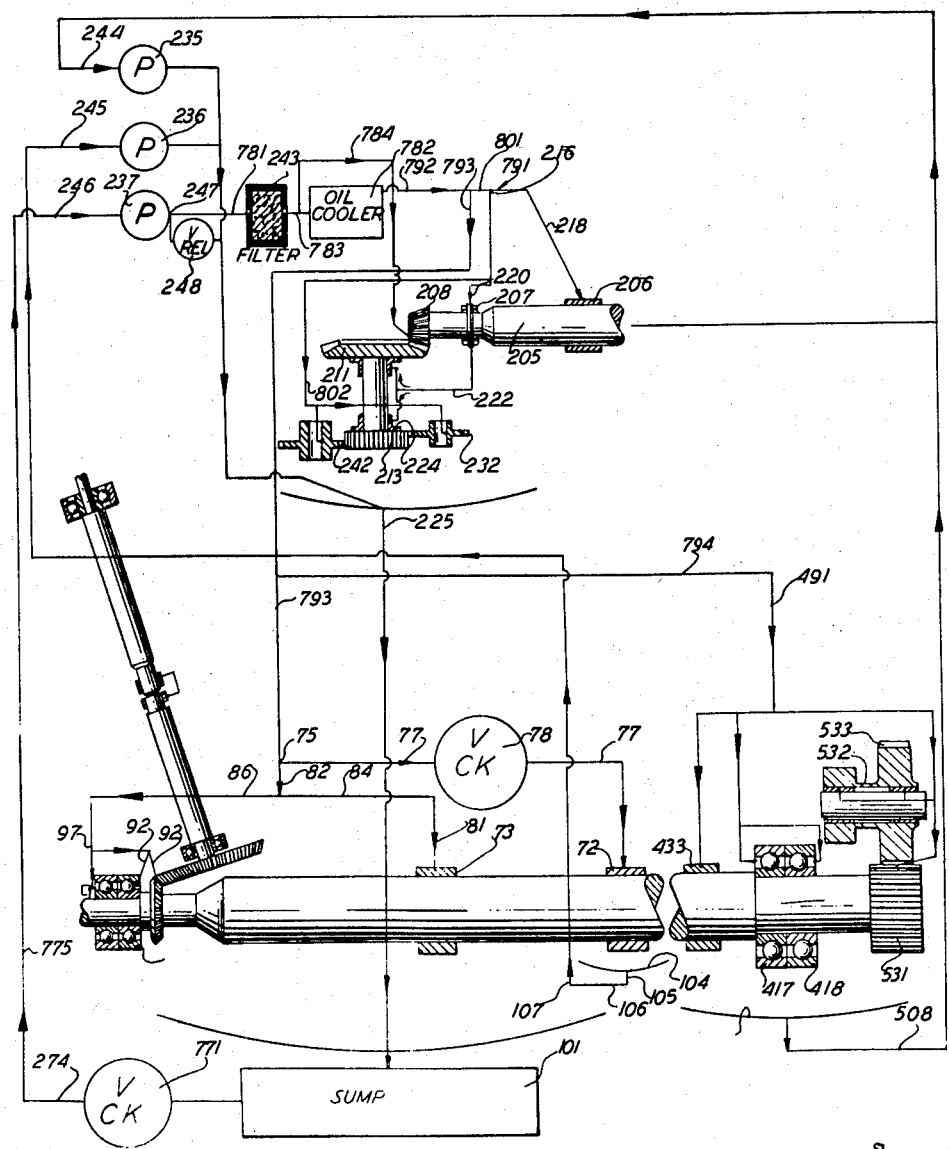
FIG. 9 is a diagrammatic illustration of the lubrication system of the gas turbine engine of the present invention.

Referring now to FIG. 9, there is shown a diagrammatic illustration of the lubrication system of the gas turbine engine of this invention. The lubrication system is provided with a main sump 101, which is shown in cross section in FIG. 2, and a pair of auxiliary sumps, one of which is designated by the numeral 104, as shown in FIG. 3, for scavenging the low pressure spool shaft bearing 72. The other auxiliary sump, designated by the numeral 507, and shown as a bore in FIG. 3, scavenges the power turbine bearings 417, 418 and 433, and the bearings and gearing mechanism of the reduction gear train including sun gear 531 and planetary gear assemblies 532.

The Gerotor pump 235 shown in FIGS. 7 and 8, is connected to the bore or sump 507 by means of a line 508 and the inlet conduit 244 shown in FIG. 8. The Gerotor pump 236 is connected to the auxiliary sump 104 through the pipes 105, 106 and the bore 107 in the low pressure spool housing, shown in FIGS. 2 and 3, and by the inlet conduit 245 to the pump shown in FIG. 8. As previously pointed out in the discussion of FIGS. 7 and 8, the pumps 235 and 236 discharge into chamber 251 located in the side of accessory gear box housing 196. The chamber 251 empties into the lower part of the accessory gear box housing through the opening 252. The oil in the bottom of the accessory gear box housing 196 is then returned to the main sump 101 through the interconnecting conduit 225 which connects the accessory gear box housing 196 with the low pressure spool housing 71 and through the cored openings in the low pressure spool housing. The sump 101 is connected to the Gerotor pump 237 through a check valve 771, shown in FIG. 2, a pipe 772 secured to the low pressure spool housing 71, and drilled conduits 773 and 774 in the low pressure spool housing.

Figure 5:
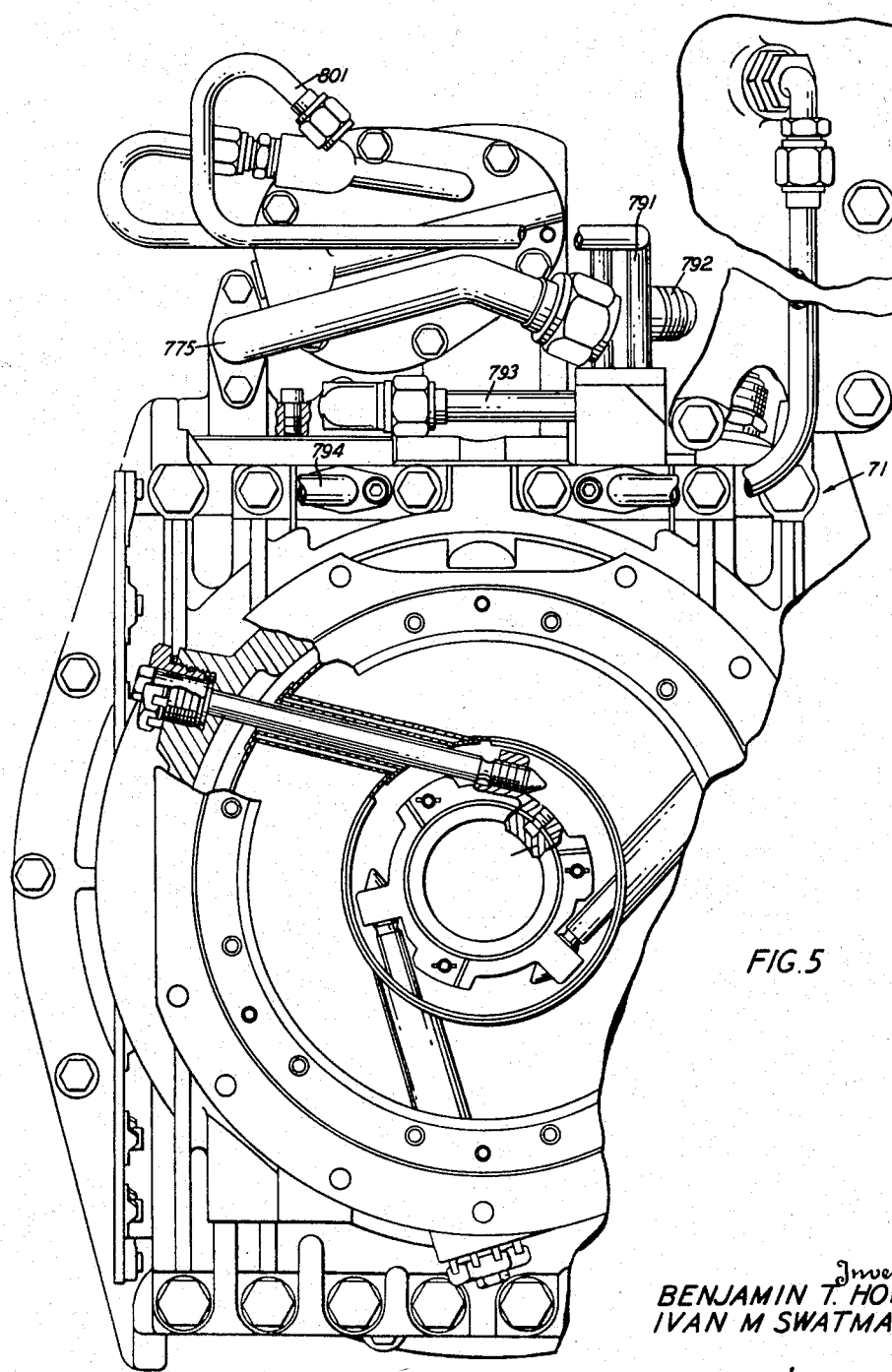
FIG. 5 is a rear elevational view partially in section of the low pressure spool housing and casing with other portions of the engine being shown in elevation.

Referring now to FIG. 5, there is shown an external conduit 775 which is connected to the drilled conduit 774 in the low pressure spool housing at a point above the low pressure spool and to the inlet conduit 246 for the Gerotor pump 237.

Lubricating oil from the Gerotor pump 237 is discharged into the opening 247 which is connected to filter 243 by means of a line 781, shown in schematic form in FIG. 9. As the oil is filtered it is delivered to an oil cooler 782 which is connected to the output of the filter by means of a conduit 783 which can be seen by reference to FIG. 2. The oil cooler 782 may be positioned to receive cooling air from the intercooler fan 16.

The pressure relief valve 248, shown in FIG. 8, is connected with the discharge openings from Gerotor pumps 235 and 236, and in case excessive pressures are built up in the pump 237, this valve will open and discharge part of the output into the chamber 251 in the accessory gear box housing 196. A portion of the oil from the oil filter bypasses the oil cooler 782, and is directed onto the point where the bevel gears 208 and 211 intermesh by means of conduit 784. The cooled oil from the oil cooler is delivered into a manifold 791, as shown in FIG. 5, from a conduit 792 which may be connected to the oil cooler by means of an oil line not shown. From the manifold 791, oil is delivered to lubricate the low pressure spool bearings 72, 73 and 74 by means of a conduit 793 and the drilled conduit 75 in the low pressure spool housing 71. The conduit 75 can be seen by reference to FIG. 4. From the conduit 75 oil is delivered under pressure to the bearings 72, 73 and 74 through the conduits previously described in connection with the description of FIGS. 2, 3 and 4.

Oil under pressure is also delivered to the conduit 491, as shown in FIG. 3, by means of the conduit 793 and a conduit 794 which is partially shown in FIG. 5. The path of the oil from conduit 491 to the bearings and gears of the power turbine and the reduction gear train has been described previously in connection with FIG. 3.

Figure 2:
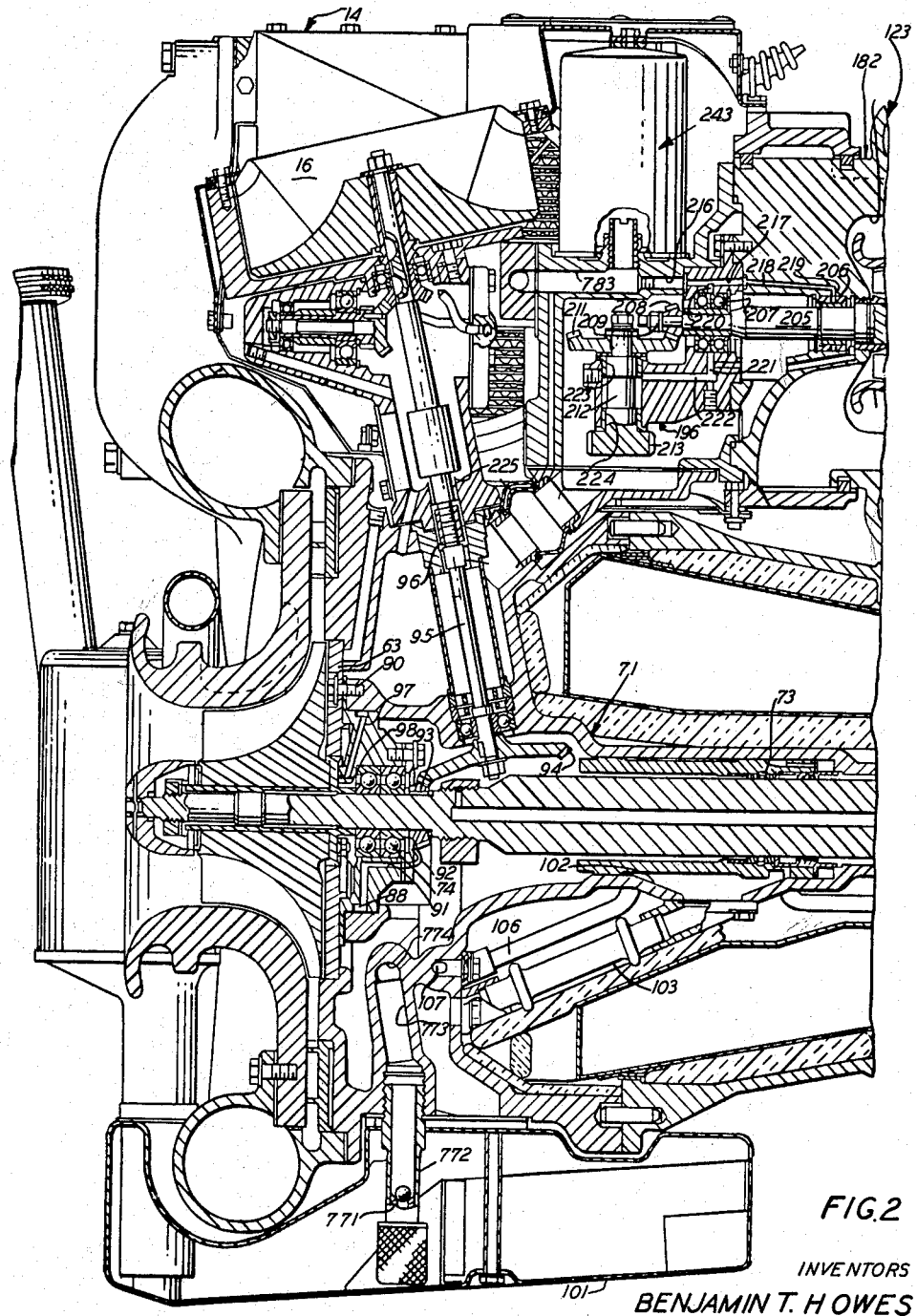

Oil under pressure is supplied to the high pressure spool bearings 206 and 207 through a conduit 801 (see FIG. 5) which is connected to the manifold 791 and is partially shown in FIG. 5. The conduit 801 is connected to supply oil under pressure to the opening 216, as shown in FIG. 2, in the accessory gear box housing 196. The oil is then supplied to bearings 206 and 207 as well as bearings 223 and 224 of the accessory gear box shaft 212 by means of the conduits shown in FIG. 2 and previously described. Oil under pressure is also supplied to the sleeve bearings supporting the idler gears 232 and 242 of the accessory gear box by means of a conduit 802 which conveys a portion of the oil flowing in conduit 801 to these bearings.

Check valves 78 and 771 are provided to prevent oil from draining into the sump 104 and the sump 101, respectively, when the engine is shut down. The check valve 771 is an ordinary ball type check valve which permits oil to flow upwardly through the conduit 774, but will prevent oil from flowing in the reverse direction. The check valve 78, on the other hand, is a valve which requires a certain amount of pressure to open it, and when the engine is shut down the pressure of the oil in the lines above the check valve is not sufficient to open it. These check valves insure adequate lubrication for all points in the engine from the moment the engine is started.

It is apparent from the description of the lubricating system for the gas turbine engine and from an inspection of FIG. 9, that the pumps 235 and 236 serve as scavenge pumps to pump the oil collected in auxiliary sumps 104 and 507 into the main sump 101. The pump 237 then pumps the oil from the main sump 101 to the various lubrication points in the engine.

There is thus provided for the gas turbine engine of this invention an integrated lubricating system for all of the bearings supporting all of the various shafts in the engine and for the various gear sets employed. Additionally, there are provided strategically placed check valves which prevent the oil in the system from draining into the various collection points when the engine is at rest.

It will be understood that the invention is not to be limited to the exact construction shown and described and that various changes and modifications may be made without departing from the spirit and scope of the invention, as defined in the appended claims.

We claim:

1. A gas turbine engine comprising a low pressure spool housing having an internal opening positioned therein, a low pressure spool including a compressor, a turbine and an interconnecting shaft, said compressor being adapted to initially compress air taken into the gas turbine engine, a plurality of bearings rotatably supporting said low pressure spool within said low pressure spool housing, a power turbine, a plurality of bearings, said bearings rotatably supporting said power turbine in said gas turbine engine, said power turbine being adapted to power an external load, a high pressure spool housing, an accessory gear box housing affixed to said high pressure spool housing, a high pressure spool, a plurality of bearings rotatably supporting said high pressure spool in said high pressure spool housing and said accessory gear box housing, said accessory gear box housing having an opening positioned therein communicating with the internal opening in said low pressure spool housing, a main sump communicating with the opening in said low pressure spool housing, a first auxiliary sump positioned to collect oil from the bearings supporting said power turbine, a second auxiliary sump positioned to collect oil from one of the bearings supporting said low pressure spool, the oil from the remainder of the bearings supporting said low pressure spool being collected by said main sump, a first pump supported by said accessory gear box housing and having an inlet connected to said main sump and an outlet connected to supply all of said bearings with oil under pressure, a second pump supported by said accessory gear box housing and having an inlet connected to said first auxiliary sump, a third pump supported by said accessory gear box housing and having an inlet connected to said second auxiliary sump, said second and third pumps having outlets discharging into said accessory gear box whereby the oil discharged therefrom may flow through the opening therein, through the internal opening in said low pressure spool housing and into said main sump.

2. The gas turbine engine of claim 1 in which said first pump, said second pump and said third pump are driven by said high pressure spool.

3. A gas turbine engine comprising a low pressure spool housing having an internal opening positioned therein, a low pressure spool including a compressor, a turbine and an interconnecting shaft, said compressor being adapted to initially compress air taken into the gas turbine engine, a plurality of bearings rotatably supporting said low pressure spool within said low pressure spool housing, a power turbine, said power turbine being adapted to power an external load, a plurality of bearings, said bearings rotatably supporting said power turbine in said gas turbine engine, a high pressure spool housing, an accessory gear box housing affixed to said high pressure spool housing, a high pressure spool, said high pressure spool housing, accessory gear box and high pressure spool being located vertically upwardly from said low pressure spool, a plurality of bearings rotatably supporting said high pressure spool in said high pressure spool housing and said accessory gear box housing, said accessory gear box housing having an opening positioned therein communicating with the internal opening in said low pressure spool housing, a main sump communicating with the opening in said low pressure spool housing, a first auxiliary sump positioned to collect oil from the bearings supporting said power turbine, a second auxiliary sump positioned to collect oil from one of the bearings supporting said low pressure spool, the oil from the remainder of the bearings supporting said low pressure spool being collected by said main sump, a first pump supported by said accessory gear box housing and having an inlet, a conduit connecting said main sump with said inlet, said first pump also having an outlet connected to supply all of said bearings with oil under pressure, a check valve positioned in said conduit adjacent said main sump permitting oil to flow from said main sump toward said first pump, but preventing flow from said first pump toward said main sump, a second pump supported by said accessory gear box housing and having an inlet connected to said first auxiliary sump, a third pump supported by said accessory gear box housing and having an inlet connected to said second auxiliary sump, said second and third pumps having outlets discharging into said accessory gear box whereby the oil discharged therefrom may flow through the opening therein, through the internal opening in said low pressure spool housing and into said main sump, and a gear set interconnecting said first, second and third pumps and said high pressure spool.

4. A gas turbine engine comprising a low pressure spool housing having an internal opening positioned therein, a low pressure spool including a compressor, a turbine and an interconnecting shaft, said compressor being adapted to initially compress air taken into the gas turbine engine, a plurality of bearings rotatably supporting said low pressure spool within said low pressure spool housing, a power turbine, said power turbine being adapted to power an external load, a plurality of bearings, said bearings rotatably supporting said power turbine in said gas turbine engine, a high pressure spool housing, an accessory gear box housing affixed to said high pressure spool housing, a high pressure spool, said high pressure spool housing, accessory gear box and high pressure spool being located vertically upwardly from said low pressure spool, a plurality of bearings rotatably supporting said high pressure spool in said high pressure spool housing and said accessory gear box housing, said accessory gear box housing having an opening positioned therein communicating with the internal opening in said low pressure spool housing, a main sump communicating with the opening in said low pressure spool housing, a first auxiliary sump positioned to collect oil from the bearings supporting said power turbine, a second auxiliary sump positioned to collect oil from one of the bearings supporting said low pressure spool, the oil from the remainder of the bearings supporting said low pressure spool being collected by said main sump, a first pump supported by said accessory gear box housing and having an inlet, a conduit connecting said main sump with said inlet, a first check valve positioned in said conduit adjacent said main sump permitting oil to flow from said main sump toward said first pump but preventing flow in the reverse direction, said first pump also having an outlet, a plurality of conduits connected to said outlet to supply all of said bearings with oil under pressure including a conduit connected to supply oil to said one of said bearings supporting said low pressure spool, a second check valve positioned in said last mentioned conduit for permitting oil to flow from said first pump toward said one of said bearings but preventing flow of oil in the reverse direction, a second pump supported by said accessory gear box housing and having an inlet connected to said first auxiliary sump, a third pump supported by said accessory gear box housing and having an inlet connected to said second auxiliary sump, said second and third pumps having outlets discharging into said accessory gear box whereby the oil discharged therefrom may flow through the opening therein, through the internal opening in said low pressure spool housing and into said main sump, and means interconnecting said first, second and third pumps and said high pressure spool whereby said first, second and third pumps are driven by said high pressure spool.

5. In a gas turbine engine, a housing, a low pressure spool, a plurality of bearings rotatably supporting said low pressure spool within said housing, a high pressure spool, said high pressure spool being located above said low pressure spool in said engine, a bearing rotatably supporting said high pressure spool within said housing, an auxiliary sump positioned to receive lubricating oil from one of said bearings supporting said low pressure spool, a first pump and a second pump connected to a common shaft, a gear train interconnecting said common shaft and said high pressure spool, a housing enclosing said gear train and said first and said second pump, said first pump having an inlet connected to said auxiliary sump and an outlet connected to discharge lubricating oil into said last mentioned housing, said second pump having an inlet connected to said main sump and an outlet connected to deliver lubricating oil under pressure to the bearing of said low pressure spool and to the bearing of said high pressure spool, said housing enclosing said gear train and said pump being positioned above said main sump, and conduit means interconnecting said last mentioned housing with said main sump to permit lubricating oil to flow from said housing to said main sump under the force of gravity.

6. In a gas turbine engine, a housing, a low pressure spool, a plurality of bearings rotatably supporting said low pressure spool within said housing, a high pressure spool, a plurality of bearings rotatably supporting said high pressure spool within said housing, a power turbine, a plurality of bearings rotatably supporting said power turbine within said housing, said power turbine being adapted to power an external load, a first auxiliary sump positioned to receive lubricating oil from a plurality of bearings rotatably supporting said power turbine, a second auxiliary sump positioned to receive lubricating oil from one of the bearings supporting said low pressure spool, a main sump positioned to receive lubricating oil from the remainder of the bearings supporting said low pressure spool, a first pump, a second pump and a third pump connected to a common shaft, a gear train interconnecting said common shaft and said high pressure spool, a housing enclosing said gear train and said first pump, said second pump and said third pump, said first pump having an inlet connected to said first auxiliary sump and an outlet connected to discharge lubricating oil into said last mentioned housing, said second pump having an inlet connected to said second auxiliary sump and an outlet connected to discharge lubricating oil into said last mentioned housing, said third pump having an inlet connected to said main sump and an outlet connected to deliver lubricating oil under pressure to the bearings of said low pressure spool, to the bearings of said high pressure spool and to the bearings of said power turbine, said housing enclosing said gear train and said pumps being positioned above said main sump, and conduit means interconnecting said housing with said main sump to permit lubricating oil to flow from said housing to said main sump under the force of gravity.

References Cited in the file of this patent

UNITED STATES PATENTS

| | | |
|---|---|---|
| 2,402,467 | Thompson | June 18, 1946 |
| 2,672,278 | Newcomb | Mar. 16, 1954 |
| 2,693,248 | Gaubatz | Nov. 2, 1954 |
| 2,704,434 | Schmitt | Mar. 22, 1955 |
| 2,749,087 | Blackman et al. | June 5, 1956 |
| 2,751,749 | Newcomb | June 26, 1956 |
| 2,770,946 | Savin | Nov. 20, 1956 |
| 2,803,943 | Rainbow | Aug. 27, 1957 |
| 2,866,522 | Morley et al. | Dec. 30, 1958 |
| 2,913,069 | Kubis | Nov. 17, 1959 |
| 2,937,497 | Clark | May 24, 1960 |
| 2,951,337 | Atkinson et al. | Sept. 6, 1960 |
| 2,988,884 | Pouit | June 20, 1961 |

FOREIGN PATENTS

| | | |
|---|---|---|
| 690,120 | Great Britain | Apr. 15, 1953 |
| 732,149 | Germany | Feb. 23, 1943 |
| 695,891 | Great Britain | Aug. 19, 1953 |